United States Patent
Korb et al.

(10) Patent No.: US 6,939,092 B2
(45) Date of Patent: Sep. 6, 2005

(54) SHEET METAL HOLE CUTTER

(75) Inventors: William B. Korb, Melrose, CT (US);
Brian K. Douglas, Enfield, CT (US);
Kenneth Hall, East Longmeadow, MA (US)

(73) Assignee: Irwin Industrial Tool Company, Freeport, IL (US)

( * ) Notice: Subject to any disclaimer, the term of this patent is extended or adjusted under 35 U.S.C. 154(b) by 0 days.

(21) Appl. No.: 10/869,267

(22) Filed: Jun. 16, 2004

(65) Prior Publication Data

US 2005/0025593 A1 Feb. 3, 2005

Related U.S. Application Data

(60) Provisional application No. 60/479,664, filed on Jun. 18, 2003.

(51) Int. Cl.$^7$ .............................................. B23B 51/04
(52) U.S. Cl. ..................................... 408/206; 408/204
(58) Field of Search ................................ 408/204, 206, 408/207, 703

(56) References Cited

U.S. PATENT DOCUMENTS 1,283,258 A * 10/1918 Misener et al. ............. 408/189
1,354,830 A    10/1920 Janes, III (Continued)

FOREIGN PATENT DOCUMENTS

DE         3202024 A1 * 9/1982     ........... B23B/51/04

OTHER PUBLICATIONS

Jun. 1999 "Rotabroach" Product Catalogue, Hougen Manufacturing, Inc., Swartz Creek, Michigan.

Undated product specification for "Holesaw 278-P", Miyanaga Co., Ltd, Wilmette, Illinois.

May 2002 "Lenox® Power Tool Accessories & Hand Tools" Product Catalogue, American Saw & Mfg. Company, East Longmeadow, Massachusetts.

*Primary Examiner*—Derris H. Banks
*Assistant Examiner*—Ali Abdelwahed
(74) *Attorney, Agent, or Firm*—McCarter & English, LLP

(57) ABSTRACT

A sheet metal hole cutter has a cap plate defining a substantially circular peripheral groove and an annular shelf extending radially outwardly from the peripheral groove. An elongated band forming an approximately circular shape with opposite ends of the band contacting each other defines a base edge received within the circular peripheral groove in an abutting relationship with an inner edge of the groove. The band defines an axial depth of about ½ of an inch or less, and an outer diameter within the range of about 9/16 of an inch through about 6 inches. A weld region fixedly secures the base edge of the band to the cap plate. The annular shelf of the cap plate extends radially outwardly from the base edge of the band and defines a radial depth of at least approximately 1/16 of an inch in order to prevent overfeeding of the hole cutter through a work piece. A plurality of teeth are disposed along a cutting edge of the band, and each tooth defines a cutting surface extending between an outer edge and an inner edge of the tooth. Each cutting surface is oriented at an acute angle relative to the plane of the cap plate such that the outer edge of the respective tooth is spaced further away from the cap plate than the inner edge to thereby preferentially cut the work piece with the outer edge and create a substantially burr-free hole in the work piece.

30 Claims, 3 Drawing Sheets

U.S. PATENT DOCUMENTS

| | | | |
|---|---|---|---|
| 1,522,102 A | | 1/1925 | Cibelli |
| 2,140,192 A | * | 12/1938 | Thatcher ............. 408/206 |
| 3,559,513 A | | 2/1971 | Hougen |
| 3,565,179 A | * | 2/1971 | Paliani ............... 172/19 |
| 3,609,056 A | * | 9/1971 | Hougen ............... 408/204 |
| 3,648,508 A | | 3/1972 | Hougen |
| 3,709,627 A | | 1/1973 | Elliott, Jr. |
| 4,072,441 A | * | 2/1978 | LaPointe ............. 408/204 |
| 4,077,737 A | * | 3/1978 | Morse ................. 408/206 |
| 4,148,593 A | * | 4/1979 | Clark ................. 408/204 |
| 4,261,673 A | | 4/1981 | Hougen |
| 4,322,187 A | | 3/1982 | Hougen |
| 4,322,188 A | | 3/1982 | Hougen |
| 4,382,331 A | | 5/1983 | Kimura |
| 4,452,554 A | | 6/1984 | Hougen |
| 4,514,120 A | | 4/1985 | Hougen |
| 4,516,890 A | | 5/1985 | Beharry |
| 4,557,641 A | | 12/1985 | Hougen |
| 4,632,610 A | | 12/1986 | Hougen |
| 4,813,819 A | | 3/1989 | Hougen |
| 4,871,287 A | | 10/1989 | Hougen |
| 4,952,102 A | | 8/1990 | Hougen |
| RE33,440 E | | 11/1990 | Hougen |
| 5,145,296 A | | 9/1992 | Hougen |
| 5,205,685 A | | 4/1993 | Herbert |
| 5,207,539 A | | 5/1993 | Mueller |
| 5,466,099 A | * | 11/1995 | Sullivan et al. ...... 408/206 |
| 5,803,677 A | | 9/1998 | Brutscher et al. |
| 5,803,678 A | * | 9/1998 | Korb et al. .......... 408/206 |
| 5,988,956 A | * | 11/1999 | Omi et al. ........... 408/204 |
| 6,003,422 A | | 12/1999 | Holston |
| 6,158,324 A | * | 12/2000 | Kullmann et al. ..... 83/848 |
| 6,167,792 B1 | | 1/2001 | Korb et al. |
| 6,276,248 B1 | | 8/2001 | Cranna |
| 6,588,992 B2 | * | 7/2003 | Rudolph .............. 408/204 |
| 6,676,711 B2 | * | 1/2004 | Omi .................. 408/204 |

* cited by examiner

SHEET METAL HOLE CUTTER

CROSS-REFERENCE TO RELATED APPLICATIONS

This application claims priority to U.S. Provisional Patent Application No. 60/479,664, filed Jun. 18, 2003, the disclosure of which are incorporated herein by reference.

FIELD OF THE INVENTION

The present invention relates to apparatus and methods for cutting holes, and more particularly, to sheet metal hole cutters having circular metal bands welded to cap plates and defining cutting edges having pluralities of cutting teeth for cutting holes in sheet metal and other sheet-like materials.

BACKGROUND INFORMATION

Typical prior art sheet metal hole cutters comprise a circular base, a peripheral wall formed on one side of the base and extending axially therefrom, and a plurality of cutting teeth machined in the outer edge of the peripheral wall. The base, peripheral wall and cutting teeth are machined from a piece of steel to form a hole cutter of unitary construction. Exemplary sheet metal hole cutters of this type are sold by Miyanaga Co., Ltd. of Hyogo, Japan under the designation "Holesaw 278", and by Hougen Manufacturing, Inc. of Swartz Creek, Mich., USA, under the designation "14,000-Series Holcutters". One of the drawbacks associated with these types of prior art hole cutters is that they are relatively expensive to manufacture. For example, machining each hole cutter out of a piece of metal can be a relatively time consuming and expensive process.

In contrast to prior art sheet metal hole cutters, some prior art hole saws are manufactured by forming the saw teeth in an elongated metal band, and then welding the metal band in a circular configuration onto a rigid cap plate. Exemplary hole cutters of this type are sold by the Assignee of the present invention, American Saw & Manufacturing Co., Inc., under its LENOX® trademark. These prior art hole saws are not well suited for use as sheet metal hole cutters. For example, the radial depth of the band typically is significantly greater than necessary for cutting sheet metal. As a result, if such hole saws are used to cut sheet metal, they can be less accurate and have greater total indication run out ("TIR") than otherwise desired. Further, such hole saws are designed to cut holes through relatively thick materials, such as wood, and therefore do not have a stop or like feature to prevent the saw from over-feeding through the work piece. Rather, such hole saws purposefully define a smooth external periphery in order to allow the hole saw to pass through the work piece. Yet another drawback associated with the use of such hole saws for cutting sheet metal is that the tooth forms do not provide a sufficiently clean or burr-free hole in the work piece, and/or do not provide sufficient clearance between the cutting teeth and the work piece to facilitate smooth and accurate cutting.

Accordingly, it is an object of the present invention to provide an improved sheet metal hole cutter that overcomes one or more of the above-described drawbacks and/or disadvantages of the prior art.

SUMMARY OF THE INVENTION

The present invention is directed to a sheet metal hole cutter comprising a cap plate defining a substantially circular peripheral groove and an annular shelf extending radially outwardly from the peripheral groove. An elongated band of the hole cutter forms a closed, approximately circular shape with opposite ends of the band contacting each other. The band includes a base edge received within the circular peripheral groove in an abutting relationship with an inner edge of the groove. A weld region is formed between the band and cap plate and fixedly secures the base edge of the band to the cap plate. The annular shelf of the cap plate extends radially outwardly of the base edge of the band, and defines a radial depth between the outer edge of the shelf and the base edge of the band. The radial depth is equal to at least approximately 1/16 of an inch, and preferably is within the range of approximately 1/16 of an inch through approximately 1/4 of an inch.

A cutting edge of the band is located on a side of the band opposite the base edge and defines a plurality of teeth. A plurality of the teeth each include a carbide tip; a rake face adjacent to the tip; a curvilinear base surface located on an opposite side of the rake face relative to the tip; at least one relief surface located on an opposite side of the tip relative to the rake face; an outer edge; an inner edge; and a cutting surface extending between the outer edge and the inner edge. The cutting surface is oriented at an acute angle relative to a plane of the cap plate such that the outer edge of the respective tooth is spaced further away from the cap plate than the inner edge. Preferably, the acute angle is within the range of approximately 5° through approximately 20°, and in a currently preferred embodiment of the present invention, the acute angle is approximately 12°.

Each such tooth further includes an outer side defining an outer work-engaging surface contiguous to the outer edge; an inner side defining an inner work-engaging surface contiguous to the inner edge; and an inner clearance surface extending between the inner work-engaging surface and the cap plate. The inner clearance surface is spaced radially outwardly relative to the inner work-engaging surface for forming an inner clearance between the inner surface of the tooth and a work piece. The inner clearance is preferably within the range of about 0.005 inch through about 0.02 inch, and in a currently preferred embodiment of the present invention, the inner clearance is about 0.01 inch.

The band defines an axial depth between the outermost tooth tip and an inner surface of the cap plate of less than approximately 3/4 of an inch, and preferably approximately 1/2 of an inch or less. The band also defines an outer diameter within the range of approximately 9/16 of an inch through approximately 6 inches, and most preferably within the range of approximately 11/16 of an inch through approximately 3 inches.

In another currently preferred embodiment of the present invention, a plurality of teeth further define an outer clearance surface extending between the outer work-engaging surface and the annular shelf of the cap plate. The outer clearance surface is spaced radially inwardly relative to the outer work-engaging surface for forming an outer clearance between the outer surface of the tooth and a work piece. The outer clearance is preferably within the range of about 0.005 inch through about 0.02 inch, and in a currently preferred embodiment of the present invention, the outer clearance is about 0.01 inch.

One advantage of the present invention is that the sheet metal hole cutters can be made at significantly less expense than prior art sheet metal hole cutters machined from bar or other metal stock. Further, the hole cutters of the present invention provide equal or better cutting performance and wear life at a significantly reduced cost in comparison to such prior art sheet metal hole cutters.

Other objects and advantages of the sheet metal hole cutters of the present invention will become more readily apparent in view of the following detailed description of the currently preferred embodiments of the present invention and the accompanying drawings.

DETAILED DESCRIPTION OF THE CURRENTLY-PREFERRED EMBODIMENTS

Figure 1:
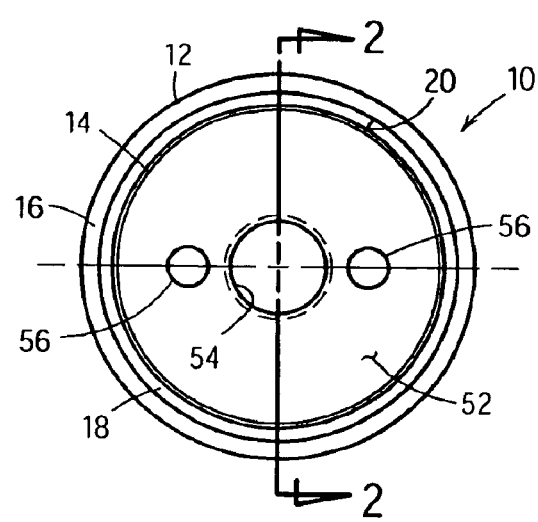
FIG. 1 is a front plan view of a sheet metal hole cutter embodying the present invention.
Figure 4:
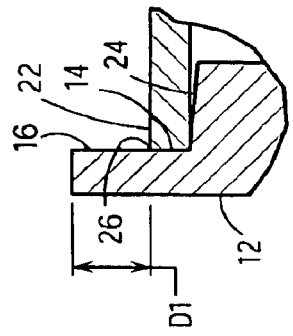
FIG. 4 is an enlarged partial, cross-sectional view of the sheet metal hole cutter of FIG. 1 taken within the broken-line detail "4" of FIG. 2.
Figure 3:
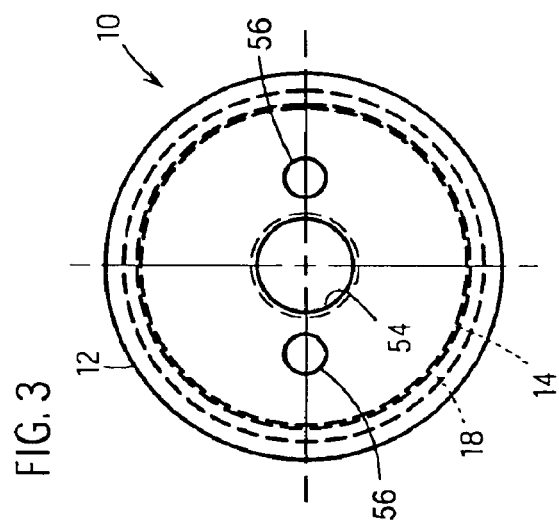
FIG. 3 is a rear plan view of the sheet metal hole cutter of FIG. 1.

In FIG. 1, a sheet material hole cutter embodying the present invention is indicated generally by the reference numeral 10. The hole cutter 10 comprises a cap plate 12 defining a substantially circular peripheral groove 14 and an annular shelf 16 extending radially outwardly from the peripheral groove. The hole cutter 10 further comprises an elongated band 18 forming an approximately circular shape with opposite ends of the band contacting each other along a line of joinder 20. The ends of the band are welded together along the line of joinder 20 to form the illustrated closed, circular shape. The band 18 includes a base edge 22 received within the circular peripheral groove 14 in an abutting relationship with an inner edge or shoulder 24 of the groove. An annular weld region 26 is formed between the base edge 22 of the band and the annular shelf 16 of the cap plate 12 to thereby fixedly secure the base edge of the band within the groove. As shown in FIG. 4, the annular shelf 16 of the cap plate 12 extends radially outwardly of the base edge of the band and defines a radial depth "D1" between the outer edge of the shelf and the base edge of the band. In the currently preferred embodiments of the present invention, the radial depth D1 is at least approximately 1/16 of an inch, and is preferably within the range of about 1/16 of an inch through about 1/4 of an inch.

Figure 5:
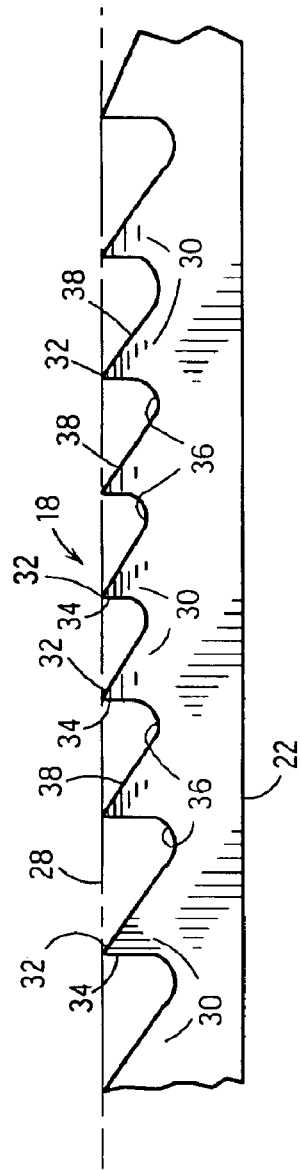
FIG. 5 is a partial, side elevational view of the band of the hole cutter of FIG. 1 prior to forming the band into a circular configuration and welding the band to the cap plate.

As shown in FIG. 5, the band 18 further defines a cutting edge 28 located on a side of the band opposite the base edge 22 and defining a plurality of teeth 30. Each tooth 30 includes a carbide tip 32, a rake face 34 formed adjacent to the tip 32, a curvilinear base surface 36 located on an opposite side of the rake face relative to the tip, and one or more relief surfaces 38 located on an opposite side of the tip relative to the rake face. Each rake face 34 preferably defines a positive rake angle. The rake angle is preferably within the range of about 2° to about 15°, and in the illustrated embodiment, the rake angle is about 6°. As shown best in FIG. 6, each tooth 30 further defines an outer edge 40, an inner edge 42, and a cutting surface 44 extending between the outer edge and the inner edge. As can be seen, the cutting surface 44 is oriented at an acute angle "A" relative to a plane "B" of the cap plate 12 (also shown in FIG. 2) such that the outer edge 40 of the respective tooth is spaced further away from the cap plate 12 than the inner edge 42. The angle A is preferably within the range of about 5° through about 20°, and in the illustrated embodiment, the angle A is about 12°. Each tooth 30 further defines an outer side defining an outer work-engaging surface 46 contiguous to the outer edge 40.

Figure 6:
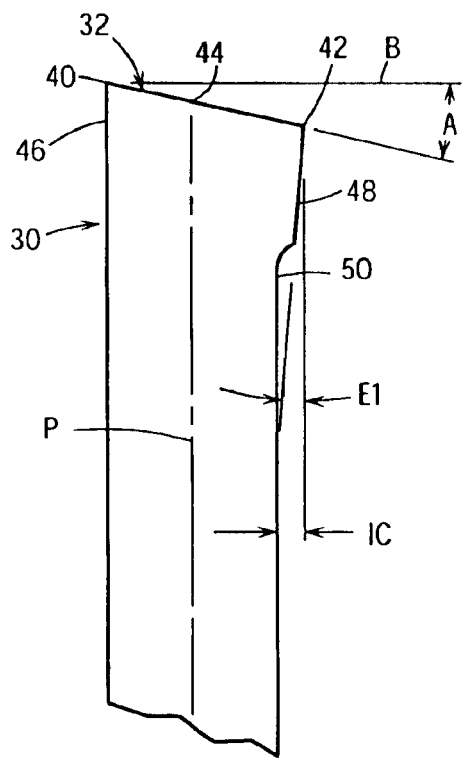
FIG. 6 is a partial, cross-sectional view of a typical cutting tooth of the sheet metal hole cutter of FIG. 1 having an inner clearance.

As shown typically in FIG. 6, each outer work-engaging surface 46 (and/or a central plane P of the tooth) is preferably oriented normal to the plane of the cap plate 12. An inner side of each tooth 30 further defines an inner work-engaging surface 48 contiguous to the inner edge 42, and an inner clearance surface 50 extending between the inner work-engaging surface 48 and cap plate 12. As shown typically in FIG. 6, the inner clearance surface 50 is spaced radially outwardly relative to the inner work-engaging surface 48 for forming an inner clearance "IC" between the inner surface of the tooth and a work piece (not shown). Preferably, the inner clearance IC is within the range of about 0.005 inch through about 0.02 inch, and in the illustrated embodiment, the inner clearance IC is about 0.01 inch. As also shown typically in FIG. 6, the inner work-engaging surface 48 is oriented at an acute angle "E1" relative to a normal to the cap plate 12 such that the inner work-engaging surface 48 tapers inwardly substantially toward the central plane "P" of the tooth. Preferably, the acute angle E1 is within the range of about 5° through about 20°, and in the illustrated embodiment, the angle E1 is about 12°.

As may be recognized by those of ordinary skill in the pertinent art based on the teachings herein, the teeth of the sheet metal hole cutters of the present invention may take any of numerous different forms, and may define any of numerous different pitch and/or set patterns. For example, the teeth may take one or more of the tooth forms illustrated in U.S. Pat. No. 6,167,792, and/or may incorporate one or more of the teachings of U.S. Pat. Nos. 6,003,422 and 6,276,248, and U.S. patent application Ser. No. 09/886,627. The foregoing patents and patent application are assigned to the Assignee of the present invention, and are hereby expressly incorporated by reference as part of the present disclosure.

Figure 2:
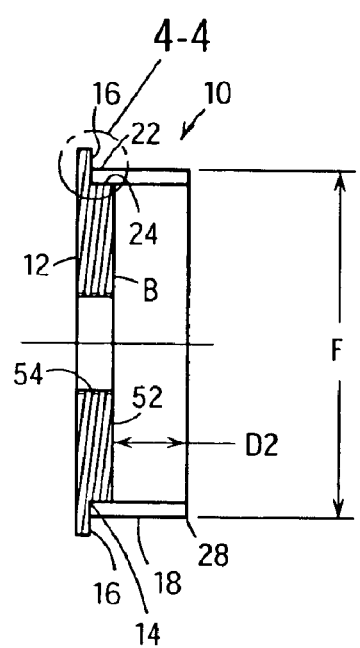
FIG. 2 is a cross-sectional view of the sheet metal hole cutter of FIG. 1 taken along line 2—2 of FIG. 1.

As shown in FIG. 2, the band 18 defines an axial depth "D2" between the outermost tooth tip 32 (FIGS. 5 and 6) and an inner surface 52 of the cap plate 12. The axial band depth D2 preferably is less than about 3/4 of an inch, and most preferably is about 1/2 of an inch or less. In the illustrated embodiment, the axial depth D2 is about 0.4 inch. Accordingly, the sheet metal hole cutters of the present invention can cut any sheet metal up to at least about 3/16 of an inch thick.

As also shown in FIG. 2, the band 18 defines an outer diameter "F". The outer diameter "F" is preferably within the range of about 9/16 of an inch through about 6 inches, and most preferably is within the range of about 11/16 of an inch through about 3 inches. Accordingly, the sheet metal hole cutters of the present invention can cut holes having diameters anywhere within the range of the outer diameter F.

In order to make the hole cutter 10, the cap plate 12 is stamped and/or machined, such as by screw machining, from sheet metal stock. In the illustrated embodiment, the rigid cap plate 12 is formed of steel having a thickness of about 0.185 inch thick, and the annular shelf 16 is about 0.062 inch thick. As shown in FIG. 1, the cap plate 12 further defines a threaded hole 54 extending through the center of the cap plate, and two through holes 56 formed on either side of the threaded hole 54. The threaded hole 54 and through holes 56 are provided for attaching an arbor and/or pilot drill assembly of a type known to those of ordinary skill in the pertinent art to the hole cutter. If desired, a spring may extend over the pilot drill to facilitate slug removal. An exemplary such arbor is disclosed in co-pending U.S. Provisional Patent Application Ser. No. 60/482,170, filed Jun. 24, 2003, entitled "Arbor For Hole Cutter And Related Method Of Use", which is assigned to the Assignee of the present invention and is hereby expressly incorporated by reference as part of the present disclosure. The band 18 is formed from carbide tipped band saw stock that is initially blanked in strip form to form one or more elongated bands. The carbide tipped teeth 30 are formed in the blanked stock and the resulting band is heat treated in a manner known to those of ordinary skill in the pertinent art. Then, the toothed band 18 is welded to the peripheral groove 14 of the cap plate 12 along the annular weld region 26 formed at the interface of the base edge 22 of the band and the annular shelf 16 (FIG. 4). In addition, the ends of the band are welded together at their line of joinder 20 (FIG. 1). As shown in FIG. 6, the shoulder 24 of the cap plate is chamfered inwardly to facilitate attachment of the circular band 18 thereto.

One advantage of the sheet metal hole cutter of the present invention is that during a cutting operation each tooth 30 preferentially cuts the work piece with its outer edge 40. Thus, when the cutter 10 breaks through the sheet metal work piece, the outer edges 40 of the teeth break through the interface between the slug and the remainder of the work piece before releasing the slug. As a result, the sheet metal hole cutters of the present invention create substantially burr-free holes and otherwise substantially smooth cut surfaces.

Another advantage of the sheet metal hole cutters of the present invention is that the relatively shallow axial depth D2 of the band allows the hole cutters to run true and achieve significantly improved total indication run out ("TIR") in comparison to prior art hole cutters.

Another advantage of the hole cutters of the present invention is that the annular shelf forms a stop surface for preventing over-feeding of the cutter through the work piece. Yet another advantage of the hole cutters of the present invention is that the inside clearance reduces friction between the cutting teeth and the work piece, and further increases the speed of cut.

Another advantage of the currently preferred embodiments of the hole cutters of the present invention is that the carbide tips of the cutting teeth provide improved blade life.

Yet another advantage of the hole cutters of the present invention is that they are significantly less expensive to manufacture than the prior art sheet metal hole cutters machined from bar or other metal stock. Further, the hole cutters of the present invention provide equal or better cutting performance and wear life at a significantly reduced cost in comparison to such prior art sheet metal hole cutters.

Figure 7:
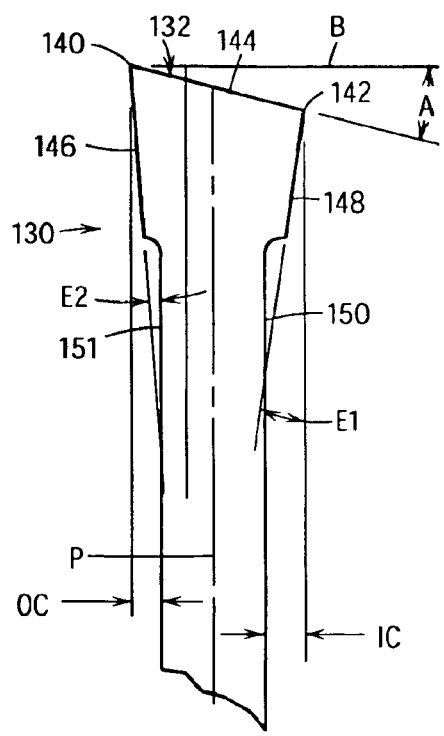
FIG. 7 is a partial, cross-sectional view of another type of a cutting tooth usable on the sheet metal hole cutter of FIG. 1 having both an inner and an outer clearance.

Turning to FIG. 7, another embodiment of a cutting tooth usable on the hole cutters of the present invention is indicated generally by the reference numeral 130. The cutting tooth 130 is substantially similar to the cutting tooth 30 described above, and therefore like reference numerals preceded by the numeral "1" are used to indicate like elements. A primary difference of the cutting tooth 130 in comparison to the cutting tooth 30 is that the cutting tooth 130 includes both an inner and an outer clearance. As can be seen, the outer side of each tooth 130 defines an outer work-engaging surface 146 contiguous to the outer edge 140, and an outer clearance surface 151 extending between the outer work-engaging surface 146 and cap plate 112 (not shown). As shown typically in FIG. 7, the outer clearance surface 151 is spaced radially inwardly relative to the outer work-engaging surface 146 for forming an outer clearance "OC" between the outer surface of the tooth and a work piece (not shown). Preferably, the outer clearance OC is within the range of about 0.005 inch through about 0.02 inch, and in the illustrated embodiment, the outer clearance OC is about 0.01 inch. As also shown typically in FIG. 7, the outer work-engaging surface 146 is oriented at an acute angle "E2" relative to a normal to the cap plate 12 such that the outer work-engaging surface 146 tapers inwardly substantially toward a central plane "P" of the tooth. Preferably, the acute angle E2 is within the range of about 5° through about 20°, and in the illustrated embodiment, the angle E2 is about 12°.

One advantage of this embodiment of the present invention is that the combined inner and outer clearance further reduces friction or binding between the outer cutting edges and work piece, and thereby further increases the speed of cut in comparison to prior art sheet metal hole cutters. Further, the outside clearance OC can be used to incrementally increase the hole size for the same cap plate size.

Figure 8:
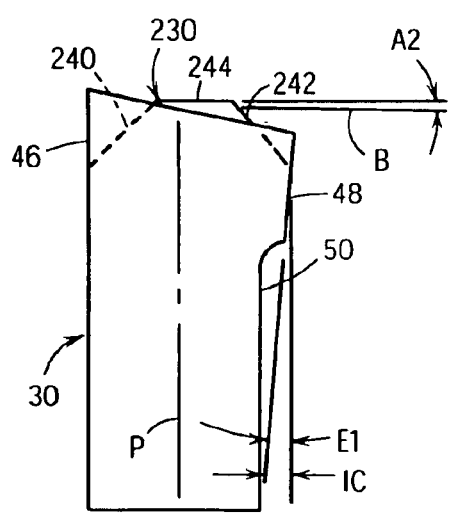
FIG. 8 is a partial cross-sectional view of another pair of cutting teeth usable on the sheet metal hole cutter of FIG. 1 that form a repeated two tooth pattern, wherein one of the teeth in each set includes a beveled inner edge and both teeth of each set include an inner clearance.

Turning to FIG. 8, a repeating tooth pair of another embodiment of the hole cutter of the present invention includes a first tooth 30 that is the same as the tooth 30 described above with reference to FIG. 6. A second tooth 230 of the repeating pair is similar in many respects to the tooth 30 described above, and therefore like reference numerals preceded by the numeral "2" are used to indicate like elements. A primary difference of the second tooth 230 in comparison to the first tooth 30 is that outer and inner corners 240 and 242, respectively, of the second tooth 230 are beveled at an acute angle relative to the central plane P of the tooth. In the illustrated embodiment, the bevel of each corner is approximately 45°; however, as may be recognized by those of ordinary skill in the pertinent art based on the teachings herein, this bevel angle is only exemplary, and may be changed as desired depending upon the cutting applications or otherwise as desired to meet performance criteria. Further, the two corners may define different bevel angles than each other. As also shown typically in FIG. 8, the cutting surface 244 of each second cutting tooth is oriented at an acute angle "A2" relative to a plane "B" of the cap plate (also shown in FIG. 2) such that the inner edge 242 of the respective tooth is spaced further away from the cap plate (not shown) than the outer edge 240. The angle A2 is preferably within the range of about 5° through about 20°, and in the illustrated embodiment, the angle A2 is about 12°. In this embodiment of the present invention, each first tooth 30 preferentially cuts the work piece with its outer edge 40 in the same manner as described above in order to create substantially burr-free holes and otherwise substantially smooth cut surfaces. Each second tooth 230, on the other hand, preferentially cuts the work piece with its inner edge 242 to thereby further distribute the cutting forces across the cutting edge of the band. Another advantage of this tooth form is that it generates relatively fine chips. Each discrete cutting edge produces relatively narrow chips, i.e., the chip width of each discrete edge is about ⅓ of the overall kerf width.

Figure 9:
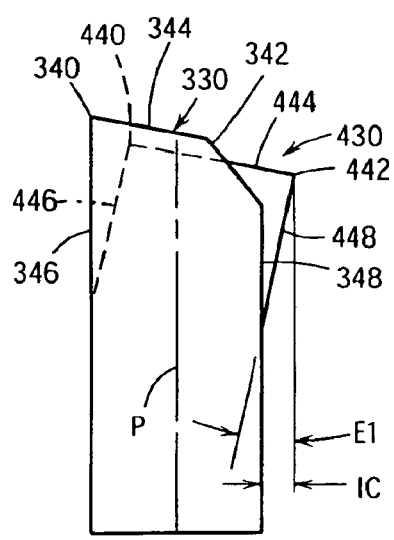
FIG. 9 is a partial cross-sectional view of another pair of cutting teeth usable on the sheet metal hole cutter of FIG. 1 that form a repeated two tooth pattern, wherein one of the teeth in each set includes a beveled inner edge and the other tooth in each set is set radially inwardly.

In FIG. 9, a repeating tooth pair of another embodiment of the hole cutter of the present invention includes a first unset tooth 330 and a second set tooth 430. The teeth 330 and 430 are similar in many respects to the tooth 30 described above, and therefore like reference numerals preceded by the numeral "3" or the numeral "4" are used to indicate like elements. A primary difference of the first tooth 330 in comparison to the tooth 30 described above, is that the first tooth 330 does not include in inner clearance IC. Further, the inner corner 342 is beveled at an acute angle. In the illustrated embodiment, the angle of the bevel is about 45°; however, as may be recognized by those of ordinary skill in the pertinent art based on the teachings herein, this bevel angle is only exemplary, and may be changed as desired depending upon the cutting applications or otherwise as desired to meet performance criteria. The second tooth 430, on the other hand, is set radially inward at a set angle E1 relative to a central plane P of the unset tooth 330 to provide an inner clearance IC. Preferably, the inner clearance IC is within the range of about 0.005 inch through about 0.02 inch, and in the illustrated embodiment, the inner clearance IC is about 0.01 inch. As also shown typically in FIG. 9, the inner work-engaging surface 448 is oriented at the acute angle "E1" relative to a normal to the cap plate 12 (or the central plane P) such that the inner work-engaging surface 448 tapers inwardly substantially toward the central plane "P" of the unset tooth. Preferably, the acute angle E1 is within the range of about 5° through about 20°, and in the illustrated embodiment, the angle E1 is about 12°.

As may be recognized by those of ordinary skill in the pertinent art based on the teachings herein, numerous changes and modifications may be made to the above-described and other embodiments of the present invention without departing from the invention as defined in the appended claims. For example, the teeth may take any of numerous different shapes, forms, sets, set patterns, etc. that are currently, or later become known. In addition, the band may be formed of any of numerous different materials, and the cutting edges of the bands may be formed of any of numerous different materials, that are currently or later become known. For example, the band may define a bi-metal construction wherein each tooth defines a cutting tip formed of a relatively hard, high speed steel for improved wear resistance and cutting life, and the backing portion of the band is formed of a less hard spring steel for improved durability. In addition, the peripheral groove on the cap plate for receiving the band may define shoulders on either side of the groove for supporting the band on both sides, rather than on only one side as illustrated in the drawings. Further, many of the specific angles and dimensions disclosed herein are only exemplary, and may be changed as desired to achieve particular performance characteristics or otherwise to meet the requirements of one or more cutting applications. Accordingly, this detailed description of the currently-preferred embodiments is to be taken in an illustrative, as opposed to a limiting sense.

What is claimed is:

1. A sheet metal hole cutter, comprising:
 a cap plate defining a substantially circular peripheral groove and an annular shelf extending radially outwardly from the peripheral groove; and
 an elongated band forming an approximately circular shape with opposite ends of the band contacting each other, wherein the band includes:
 a base edge received within the circular peripheral groove in an abutting relationship with an inner edge of the groove;
 a weld region formed between the band and cap plate and fixedly securing the base edge of the band to the cap plate, wherein the annular shelf of the cap plate extends radially outwardly of the base edge of the band and defines a radial depth between the outer edge of the shelf and the base edge of the band equal to at least approximately 1/16 of an inch; and
 a cutting edge located on a side of the band opposite the base edge and defining a plurality of teeth, wherein each of a plurality of the teeth includes:
 a carbide tip;
 a rake face adjacent to the tip;
 a curvilinear base surface located on an opposite side of the rake face relative to the tip;
 at least one relief surface located on an opposite side of the tip relative to the rake face;
 an outer edge;
 an inner edge;
 a cutting surface extending between the outer edge and the inner edge, wherein the cutting surface is oriented at an acute angle relative to a plane of the cap plate such that the outer edge of the respective tooth is spaced further away from the cap plate than the inner edge;
 an outer side defining an outer work-engaging surface contiguous to the outer edge; and
 an inner side defining an inner work-engaging surface contiguous to the inner edge;
 wherein the cutting edge further includes a plurality of inner clearance surfaces spaced radially outwardly relative to respective inner work-engaging surfaces for forming inner clearances between the inner surfaces of the teeth and a work piece; and
 wherein the band defines an axial depth between the outermost tooth tip and an inner surface of the cap plate of less than approximately ¾ of an inch; and the band defines an outer diameter within the range of approximately 9/16 of an inch through approximately 6 inches.

2. A sheet metal hole cutter as defined in claim 1, wherein each of a plurality of teeth further define an outer clearance surface extending between the outer work-engaging surface and the annular shelf of the cap plate, and the outer clearance surface is spaced radially inwardly relative to the outer work-engaging surface for forming an outer clearance between the outer surface of the tooth and a work piece.

3. A sheet metal hole cutter as defined in claim 1, wherein the radial depth of the annular shelf is within the range of approximately 1/16 of an inch through approximately ¼ of an inch.

4. A sheet metal hole cutter as defined in claim 1, wherein the axial depth of the band is approximately ½ of an inch or less.

5. A sheet metal hole cutter as defined in claim 1, wherein a plurality of teeth define an outside surface oriented approximately normal to a plane of the cap plate.

6. A sheet metal hole cutter as defined in claim 1, wherein the acute angle of the cutting surface is within the range of approximately 5° through approximately 20°.

7. A sheet metal hole cutter as defined in claim 6, wherein the acute angle of the cutting surface is approximately 12°.

8. A sheet metal hole cutter as defined in claim 1, wherein the inner clearance surface is spaced radially outwardly relative to the inner work-engaging surface by a radial distance within the range of about 0.005 inch through about 0.02 inch.

9. A sheet metal hole cutter as defined in claim 8, wherein the inner clearance surface is spaced radially outwardly relative to the inner work-engaging surface by a radial distance of about 0.01 inch.

10. A sheet metal hole cutter as defined in claim 1, wherein the inner work-engaging surface is oriented at an acute angle relative to a normal to the cap plate such that the inner work-engaging surface tapers inwardly substantially toward a central plane of the tooth.

11. A sheet metal hole cutter as defined in claim 10, wherein the acute angle of the inner work-engaging surface is within the range of about 5° through about 20°.

12. A sheet metal hole cutter as defined in claim 11, wherein the acute angle is approximately 12°.

13. A sheet metal hole cutter as defined in claim 2, wherein the outer clearance surface is spaced radially inwardly relative to the outer work-engaging surface by a radial distance within the range of about 0.005 inch through about 0.02 inch.

14. A sheet metal hole cutter as defined in claim 13, wherein the outer clearance surface is spaced radially inwardly relative to the outer work-engaging surface by a radial distance of about 0.01 inch.

15. A sheet metal hole cutter as defined in claim 2, wherein the outer work-engaging surface is oriented at an acute angle relative to a normal to the cap plate such that the outer work-engaging surface tapers inwardly substantially toward a central plane of the tooth.

16. A sheet metal hole cutter as defined in claim 15, wherein the acute angle of the outer work-engaging surface is within the range of about 5° through about 20°.

17. A sheet metal hole cutter as defined in claim 16, wherein the acute angle is approximately 12°.

18. A sheet metal hole cutter as defined in claim 1, wherein the peripheral groove defines an inner edge, and the inner edge is tapered radially inwardly in a direction from the base of the groove toward an inner surface of the cap plate to facilitate attachment of the band to the cap plate.

19. A sheet metal hole cutter as defined in claim 1, wherein the inner tooth edge is beveled.

20. A sheet metal hole cutter as defined in claim 19, wherein the angle of the bevel is approximately 45°.

21. A sheet metal hole cutter as defined in claim 1, wherein the opposite ends of the band are welded together along a line of joinder.

22. A sheet metal hole cutter as defined in claim 1, wherein the plurality of teeth define a repeating two tooth pattern including a first tooth as defined in claim 1, and a second tooth defining an outer edge, an inner edge, and a cutting surface extending between the outer edge and the inner edge, wherein the cutting surface is oriented at an acute angle relative to a plane of the cap plate such that the inner edge of the tooth is spaced further away from the cap plate than the outer edge.

23. A sheet metal hole cutter as defined in claim 1, wherein the inner clearance is formed by the inner clearance surface being spaced radially outwardly relative to said respective inner work-engaging surface.

24. A sheet metal hole cutter as defined in claim 1, wherein the inner clearance is formed by a second tooth of a repeating tooth pattern that is set radially inwardly relative to a first unset tooth of the repeating tooth pattern.

25. A sheet metal hole cutter, comprising:
first means for forming a substantially circular peripheral groove and an annular shelf extending radially outwardly from the peripheral groove; and
second means for forming a cutting edge and defining a circular shape with opposite ends that contact each other, wherein the second means includes:
a base edge received within the circular peripheral groove in an abutting relationship with an inner edge of the groove;
a weld region formed between the first means and the second means and fixedly securing the base edge of the second means to the first means, wherein the annular shelf of the first means extends radially outwardly of the base edge of the second means and defines a radial depth between the outer edge of the first means and the base edge of the second means equal to at least approximately 1/16 of an inch, and the cutting edge of the second means is located on a side of the second means opposite the base edge and defines a plurality of teeth, wherein each of a plurality of the teeth includes:
a carbide tip;
a rake face adjacent to the tip;
a curvilinear base surface located on an opposite side of the rake face relative to the tip;
at least one relief surface located on an opposite side of the tip relative to the rake face;
an outer edge;
an inner edge;
a cutting surface extending between the outer edge and the inner edge, wherein the cutting surface is oriented at an acute angle relative to a plane of the first means such that the outer edge of the respective tooth is spaced further away from the first means than the inner edge;
an outer side defining an outer work-engaging surface contiguous to the outer edge; and
an inner side defining an inner work-engaging surface contiguous to the inner edge;
wherein the cutting edge further includes a plurality of inner clearance surfaces spaced radially outwardly relative to respective inner work-engaging surfaces for forming inner clearances between the inner surfaces of the teeth and a work piece; and
wherein the second means defines an axial depth between the outermost tooth tip and an inner surface of the first means of less than approximately 3/4 of an inch; and the second means defines an outer diameter within the range of approximately 9/16 of an inch through approximately 6 inches.

26. A sheet metal hole cutter as defined in claim 25, where the first means is a cap plate.

27. A sheet metal hole cutter as defined in claim 25, wherein the second means is an elongated metal band.

28. A sheet metal hole cutter as defined in claim 25, wherein the plurality of teeth define a repeating two tooth pattern including a first tooth as defined in claim 25, and a second tooth defining an outer edge, an inner edge, and a cutting surface extending between the outer edge and the inner edge, wherein the cutting surface is oriented at an acute angle relative to a plane of the first means such that the inner edge of the tooth is spaced further away from the first means than the outer edge.

29. A sheet metal hole cutter as defined in claim 25, wherein the inner clearance is formed by the inner clearance surface being spaced radially outwardly relative to said respective inner work-engaging surface.

30. A sheet metal hole cutter as defined in claim 25, wherein the inner clearance is formed by a second tooth of a repeating tooth pattern that is set radially inwardly relative to a first unset tooth of the repeating tooth pattern.

* * * * *